POWER DIVIDER

Filed Dec. 29, 1966 Sheet 1 of 2

INVENTOR.
BERNARD G. VIENT
BY David M. Keay
AGENT.

Jan. 14, 1969 B. G. VIENT 3,422,377

POWER DIVIDER

Filed Dec. 29, 1966 Sheet 2 of 2

INVENTOR.
BERNARD G. VIENT

BY David M. Keay

AGENT.

United States Patent Office 3,422,377

Patented Jan. 14, 1969

3,422,377

POWER DIVIDER

Bernard G. Vient, Burlington, Mass., assignor to Sylvania Electric Products Inc., a corporation of Delaware Filed Dec. 29, 1966, Ser. No. 605,823
U.S. Cl. 333—9 4 Claims
Int. Cl. H01p 5/12

ABSTRACT OF THE DISCLOSURE

A radio frequency power divider employing a plurality of two-conductor transmission lines with the like conductors of each transmission line joined together at one end to accommodate a common input terminal. One conductor of each of the two conductor transmission lines includes a multiple-sectioned impedance matching transformer. Resistive elements are connected to the transformer sections at intervals along their length.

Figure 1:
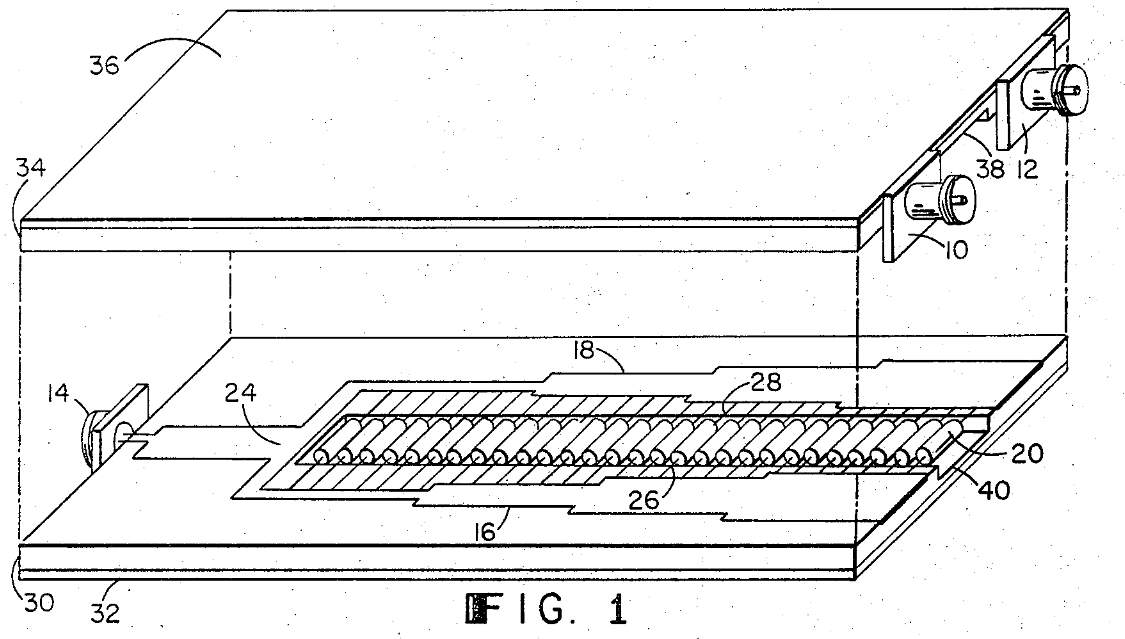

The present invention relates to microwave apparatus. More particularly, it is concerned with power dividers capable of distributing input radio frequency energy among a plurality of equal or unequal output loads.

Radio frequency power dividers have many applications, some of which impose more stringent operational requirements than others. In high power over-the-horizon radars, for example, it is desirable to have a power divider capable of dividing a high power input radio frequency signal into a plurality of non-interacting output signals over a wide frequency range of signals. Certain high power, multi-frequency broadcast communications systems also have these requirements. The number of signal outputs, either odd or even, is a function of the requirements of the particular system in which the power divider is used. Prior art power dividers of which applicant is aware lack the capabilities enumerated.

Representative of available power dividers is the power divider which is the subject of U.S. Patent No. 3,091,743, assigned to the assignee of the present application. This power divider, because of its one-quarter wavelength construction, is limited to use over a relatively narrow bandwidth; and because the isolation of high power difference signals is limited by the total dissipative rating of the isolating resistors employed, it is restricted from very high power applications.

Accordingly, it is an object of the present invention to provide an improved power divider.

It is another object of the invention to provide a power divider capable of dividing a high power input radio frequency signal into a plurality of equal or unequal, non-interacting radio frequency signals over a wide bandwidth.

Briefly, a power divider according to the invention includes a group of two-conductor transmission lines. A first conductor of each of the two-conductor transmission lines, the signal-carrying conductor, includes an impedance transforming section which has a characteristic impedance transforming ratio to match the input impedance condition to the output impedance conditions. The like conductors of each of the transmission lines are joined together at one end thereof to accommodate a common input terminal. In addition, an output connection means is provided at the other end of each of the transmission lines.

A plurality of sets of resistive loading elements are provided; the number of resistive elements in each set is equal to the number of transmission lines and each set has a resistive element associated with each of the two-conductor transmission lines. One terminal of each resistive element is connected to a common, otherwise unconnected, terminal with each other resistive element within each set. The remaining terminal of each resistive element within each set is coupled to the signal carrying conductor of its respective associated transmission line at points which are equidistant from the common input terminal. The sets of resistive elements are connected at selected intervals along the signal-carrying conductors.

The resistive elements serve to dissipate power when the power divider is operating in the "odd" or out-of-phase mode as will be explained hereinafter due to the voltage differentials which then exist across the resistive loading elements. When the device is operating in the "even" or in-phase mode, no voltage differentials exist across the resistive loading elements and; therefore no power is dissipated. Hence, the amount of high power isolation which the power divider is capable of providing is approximately equal to the total dissipative rating of the resistive loading elements.

Figure 2:
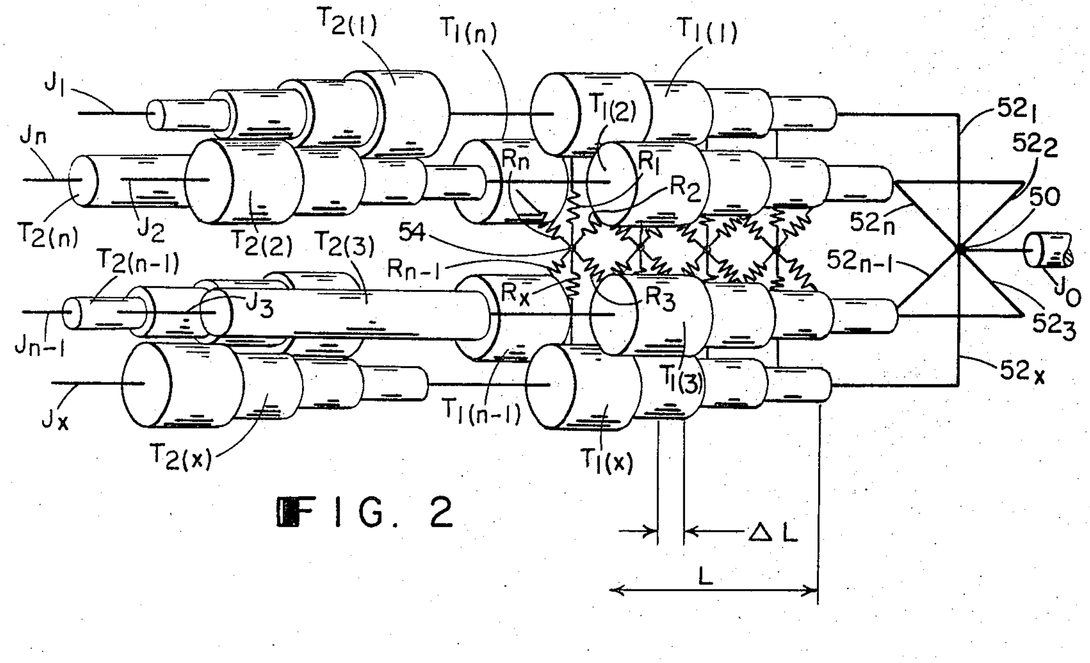
Figure 3A:
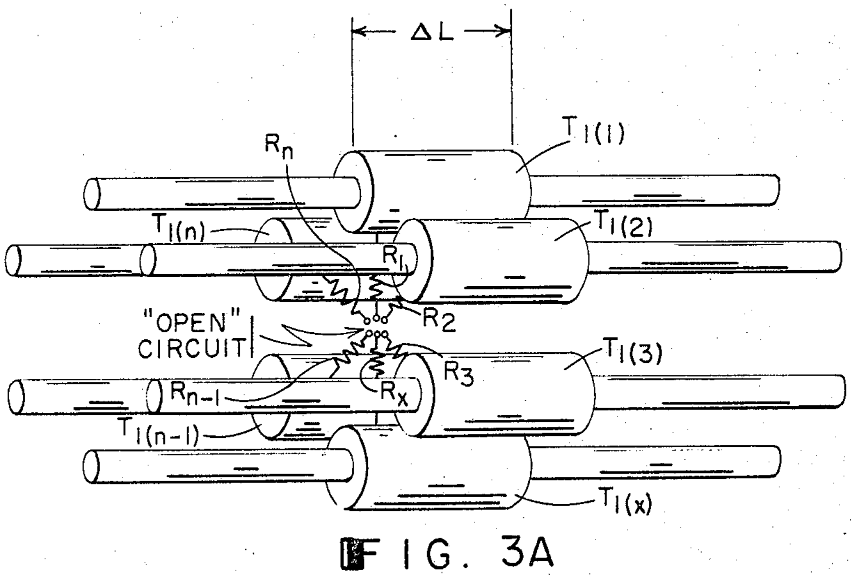
Figure 3B:
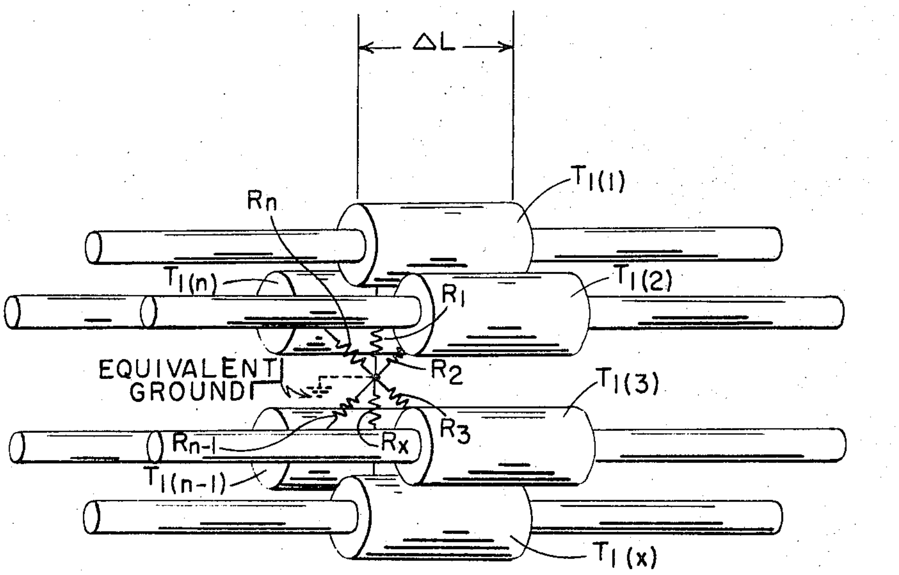

The foregoing, together with other objects, features, and advantages of the invention, will be better understood from the following detailed description taken in conjunction with the accompanying drawings wherein:

FIG. 1 is an exploded perspective view of a 2:1 power divider according to the invention, FIG. 2 is a schematic representation of the inner conductor network of 6:1 power divider according to the invention, FIG. 3A is a schematic representation of a portion of the power divider shown in FIG. 2 for explaining the operation in the even mode, and FIG. 3B is a schematic representation of a portion of the power divider shown in FIG. 2 for explaining the operation in the odd mode.

The procedure employed to analyze and understand the operation of the invention is the technique of symetrical analysis. This technique was introduced in a presentation to the American Institute of Electrical Engineers on June 28, 1918, by C. L. Fortescue, and was subsequently published by the AIEE. Any alternating current signal may be graphically and analytically represented by a vector which has a magnitude proportional to the amplitude of the signal and a phase angle. This vector may be resolved into any number of component vectors of various magnitudes and phase angles whose vectoral sum always equals the parent vector. In essence, the technique maintains that any set of N unsymmetrical (unequal phases and unequal amplitudes) vectors may be resolved into N sets of symmetrical component vectors wherein one of the N sets of symmetrical components will have N equal amplitude, equal phases components, herein referred to as the "even" or in-phase mode, and all of the other sets of symmetrical components will have equal amplitude vectors, but these other sets of component vectors will have symmetrical phases such that the sum of the vector components in each set will be zero. These symmetrical sets are herein reterred to as the "odd" or out-of-phase mode.

It will be shown that as the device according to the invention divides high power signals, it acts to dissipate the odd mode signals, while passing the even mode signals unattenuated, thereby displaying a high degree of isolation over a wide variation of output conditions.

During the discussion of the detailed construction and operation of the invention which follows, the device will be referred to as a power divider although it will be described as functioning as either a power divider or a power combiner. This device is capable, as are most power dividers, of reciprocal operation, and the manner of operation chosen in each instance is that which most clearly illustrates the operation of the device.

Referring now to FIG. 1, there is shown an exploded view of a first embodiment of the invention useful to illustrate the operation and the principles involved. The device shown is a 2:1 power divider with equal output impedances and equal power division. In this instance, the device is to be described as functioning as a power combiner. Two input radio frequency signals are applied at the input ports 10 and 12. The combined radio frequency signal appears at the output port 14. A pair of signal-carrying conductors, 16 and 18, associated with input ports 10 and 12, respectively, hereinafter called branch lines, are joined at a common junction 24. A distributed resistive loading of the branch lines 16 and 18 is accomplished, in this embodiment, by connecting a plurality of resistors 20 between the signal-carrying conductors of the two branch lines 16 and 18. The two connections for each resistor, for example, 26 and 28, are each equidistant along the branch lines 16 and 18 from the common junction 24.

The device is shown in a stripline configuration, although it may be constructed in any two-conductor transmission line. The signal-carrying conductor network described above is supported between two layers of dielectric material, 30 and 34. Outside of the dielectric material is an upper metallic ground plane 36 and a lower metallic ground plane 32. The two ground planes, 32 and 36, function as the second conductor of the transmission line and are connected together by the outer conductors of the coaxial connectors at ports 10, 12, and 14. The lower dielectric material layer 30 has a channel 40 running longitudinally between the branch lines 16 and 18, but stopping short of the common junctions 24. The upper dielectric material layer 34, also has a channel 38 cut in it and coextensive with the lower channel 40. The combined channel serves to house the plurality of resistors 20.

Branch lines 16 and 18 are conventional impedance matching transforming structures, in this case four-section chebishev transformers, used to match output port 14 when input ports 10 and 12 are terminated in their characteristic impedances. Thus, when the structure is analyzed using the technique of symmetrical analysis, the input ports 10 and 12 are matched and deliver their total power to the output port 14 when the input ports 10 and 12 are fed in the "even" or in-phase mode. For the even mode case, the voltage which appears across any two points of physical symmetry, such as 26 and 28 is zero; therefore, with no voltage present across these points of physical symmetry, there is no power lost through dissipation in the interconnected loading resistors 20 for this mode.

If, however, the input ports 10 and 12 are fed out-of-phase, the odd mode, then an equivalent electrical ground exists midway between the branch lines 16 and 18. There now exists a voltage differential between the points of physical symmetry, such as 26 and 28, and the resistors 20 now dissipate energy. A measure of the isolation that exists between the input ports 10 and 12 is the reflection coefficient measured at the input ports 10 and 12 assuming that a short circuit exists at the output port 14 and the existence of an electrical ground at the mid-point of the resistors 20. By proper utilization of the resistive loading, as will be explained hereinafter, this reflection coefficient can be made very small; therefore, providing a high degree of isolation between the input ports 10 and 12.

Referring now to FIG. 2, there is shown in schematic form an *n*-way power divider according to the invention. The device is depicted as a coaxial transmission line device; however, only the center conductor network is shown. The input radio frequency signal to be divided is applied at the input port $J_0$ and the desired $n$ isolated signals appear at the output ports $J_1, J_2 \ldots J_x \ldots J_n$. The $n$ output signals may be either equal or unequal, and $n$ may be either an odd or an even number.

The input port $J_0$ is connected to a junction 50 where the input signal is divided $n$ ways. Connected to the junction 50 are $n$ distributing lines $52_1, 52_2 \ldots 52_x \ldots 52_n$, which carry the signals to a group of $n$ impedance transforming sections $T_{1(1)}, T_{1(2)} \ldots T_{1(x)} \ldots T_{1(n)}$. These impedance transforming sections are then connected through a second group of impedance transforming sections $T_{2(1)}, T_{2(2)} \ldots T_{2(x)} \ldots T_{2(n)}$, to the output ports $J_1, J_2 \ldots J_x \ldots J_n$. Connected between points of physical symmetry in the structure of the first impedance transforming sections $T_{1(1)}, T_{1(2)} \ldots T_{1(x)} \ldots T_{1(n)}$, that is at equal distances from the common junction 50, are a plurality of sets of $n$ resistive loading elements, each including elements $R_1, R_2 \ldots R_x \ldots R_n$. One of the resistive loading elements $R_1, R_2 \ldots R_x \ldots R_n$, within each set is associated with an impedance transforming section $T_{1(1)}, T_{1(2)} \ldots T_{1(x)} \ldots T_{1(n)}$. One terminal of each resistive loading element $R_1, R_2 \ldots R_x \ldots R_n$ of each set is connected to the associated first impedance transforming section $T_{1(1)}, T_{1(2)} \ldots T_{1(x)} \ldots T_{1(n)}$, and the second terminal of each of the resistive loading elements $R_1, R_2 \ldots R_x \ldots R_n$ of each set is connected together at a common, otherwise unconnected junction, such as 54.

In operation, if $P_1, P_2 \ldots P_x \ldots P_n$ are the fractions of the power of the input signal to be supplied to the output ports $J_1, J_2 \ldots J_x \ldots J_n$, respectively, and if the characteristic output impedances for each line, respectively, are $Z_1, Z_2 \ldots Z_x \ldots Z_n$, and if the characteristic impedance of the input port $J_0$ is $Z_0$, then, the respective input branch line impedances as seen at the input junction 50 are $Z_0/P_1, Z_0/P_2 \ldots Z_0/P_x \ldots Z_0/P_n$. These relationships assure a matched condition at the input port $J_0$, because the sum of the impedances in parallel equals the characteristic input impedance to the device.

The first group of impedance transforming sections $T_{1(1)}, T_{1(2)} \ldots T_{1(x)} \ldots T_{1(n)}$, have identical impedance transforming ratios so that equal voltages are produced on all of the transmission lines at points equidistant from the common input junction 50 when the device is fed in the even mode. The value of this ratio is chosen so that the average of the branch line input impedances, $Z_0/n$, is transformed into the average of the output impedances $$\frac{Z_1+Z_2+\ldots+Z_x+\ldots+Z_n}{n}$$

The second group of impedance transforming sections $T_{2(1)}, T_{2(2)} \ldots T_{2(x)} \ldots T_{2(n)}$ accomplish impedance transformation between the above mentioned average output impedances and the associated output impedances $Z_1, Z_2 \ldots Z_x \ldots Z_n$.

In this embodiment chebishev transformer sections are used for the impedance transforming sections for both groups to provide a power divider which is capable of operating efficiently over a wide bandwidth. These transformer sections are several times wider in bandwidth than one-quarter wavelength impedance transforming sections.

For a determination of the proper values of resistance of the resistive loading elements $R_1, R_2 \ldots R_x \ldots R_n$ and a better understanding of the operation of the device, consider the portion of the device designated as $\Delta L$. This portion is shown expanded in FIGS. 3A and 3B. In FIG. 3A, the power divider is operating in the even mode (having equal phase and amplitude signals on the transmission lines), a perfect match between the power divider and its associated loads. The voltages at the $\Delta L$ sections of all branch lines $T_{1(1)}, T_{1(2)} \ldots T_{1(x)} \ldots T_{1(n)}$, are equal, thereby creating an equivalent open circuit at the common junction of the associated resistive loading elements. If, however, the signals carried on the branch lines $T_{1(1)}, T_{1(2)} \ldots T_{1(x)} \ldots T_{1(n)}$, are in the odd mode (having equal amplitudes, but phases which add up to zero), as in FIG. 3B, there is now a voltage differential across the resistive elements and these signals are dissipated by the resistive loading elements.

The above explanation of the operation of the invention has considered the cases of the even and the odd modes separately. However, during the normal operating conditions, the signals of concern will contain components of both modes. It is possible by use of the technique of symmetrical components to analyze the operation of the device to show that the even mode components pass through unattenuated and the odd mode components are dissipated in the resistive loading elements.

The resistance values of the resistive loading elements $R_1, R_2 \ldots R_x \ldots R_n$ are chosen to be proportional to the characteristic impedance of the transmission line to which they connect. This insures the existence of an equivalent ground at the central junctions of the resistive loading elements, and an equal attenuation of the difference signal on all of the transmission lines.

In order to obtain a uniform dissipation along the series of sets of resistive elements, and hence, the highest power handling capability for a given degree of isolation, the attenuation factor $\gamma(1)$ should vary along the length of each impedance transforming section so that it is at a maximum at the ends near the common junctions and at a minimum at the output ends of the resistively loaded impedance transforming sections.

The total amount of resistive loading is chosen so that the output impedance matching condition for any odd mode excitation is held to a given limit. This condition is analyzed separately for each branch line by assuming that the output port for the individual branch line is energized exclusively and that short circuits exist along the central resistive loading axis and at the common junction near the input port $J_0$. As the input signal is then propagated along the line toward the short circuit condition at $J_0$, a voltage differential appears across each resistive loading element and a portion of the signal is dissipated. When the remaining signal reaches the short circuit at $J_0$, it is reflected back along the line toward the output port. Again, a voltage differential appears across each resistive loading element and an additional fraction of the signal is dissipated until a much smaller signal arrives back at the output port where the initial signal entered. The magnitude of this returning reflected signal determines the reflection coefficient of the analyzed branch line which is proportional to the degree of isolation.

A 2:1 power divider in accordance with the invention as shown in FIG. 1 has been evaluated. The output impedances were equal and the branch lines consisted of four-section chebishev transformer sections. The distributed resistive loading was supplied by thirty-two 2000 ohm resistors connected at regular intervals between the transformer sections. The device was constructed in one-half inch ground plane spacing, Rexolite strip transmission line, and was tested over a frequency range from 100 to 850 megahertz. The isolation between output ports averaged 24.6 db with the minimum isolation of 16.0 db occurring at a frequency of 100 megahertz and the maximum isolation of 31.4 db occurring at 600 megahertz. It can, therefore, be readily seen that a power divider is provided which is capable of dividing high power input signals over a wide bandwidth of frequencies into highly isolated output signals.

While there has been shown and described what are considered to be preferred embodiments of the present invention, it will be obvious to those skilled in the art that various changes and modifications may be made therein without departing from the invention as defined in the appended claims.

What is claimed is:

1. A microwave power divider comprising a group of two-conductor transmission lines, a first conductor of each of the group of two-conductor transmission lines being a signal carrying conductor, the signal carrying conductor of each of the group of two-conductor transmission lines including an impedance transforming section having a characteristic impedance transforming ratio, means for conductively joining like conductors of the transmission lines together at one end thereof to form a common junction of each group of like conductors, means for coupling an input signal to the one end of the transmission lines, a plurality of sets of resistive elements, each set of resistive elements including a number of resistive elements equal to the number of two-conductor transmission lines and having a resistive element associated with each of the two-conductor transmission lines, means for connecting one terminal of each of the resistive elements within each set together at otherwise unconnected terminals, means for coupling to the signal carrying conductor of each of the two-conductor transmission lines at selected intervals the other terminals of the associated resistive element from each of the plurality of sets of resistive elements, the resistive elements within each set being connected to their associated signal carrying conductors at equal distances from the common junction of all signal carrying conductors, and an output connection means connected to the other end of each separate one of the group of two-conductor transmission lines.

2. A microwave power divider according to claim 1 in which each impedance transforming section includes a chebishev transformer section and said resistive elements in each set have resistances which are proportional to the impedance transforming ratios of said associated transmission lines.

3. A microwave power divider according to claim 2 in which each impedance transforming section further includes a second chebishev transformer section serially connected with the first chebishev transformer section, said first chebishev transformer sections have equal impedance transforming ratios such that the average input impedance to each of said group of two-conductor transmission lines is transformed into the average output impedance, said second chebishev transformer sections each have an impedance transforming ratio such that the average output impedance from said first chebishev transformer sections is transformed into the characteristic output impedance present at each of said output connection means, and each of said two-conductor transmission lines is a coaxial transmission line and the plurality of sets of resistive elements are connected to the inner conductor.

4. A microwave power divider according to claim 3 in which said plurality of sets of resistive elements are connected to the first chebishev transformer sections at regular selected intervals and the resistances of said plurality of sets of resistive elements vary from a maximum at the end near the common junction to a minimum at the end near the output connection means whereby power is uniformly dissipated along the length of the first chebishev transformer sections.

References Cited

FOREIGN PATENTS 1,360,391 3/1964 France.

HERMANN KARL SAALBACH, *Primary Examiner.*

PAUL L. GENSLER, *Assistant Examiner.*

U.S. Cl. X.R.

333—35